United States Patent

Kuck et al.

[11] Patent Number: 5,939,137
[45] Date of Patent: Aug. 17, 1999

[54] METHOD FOR COATING AN OPTICAL FIBER WITH A PLURALITY OF TRANSDUCERS IN A BATH OF COATING MATERIAL

[75] Inventors: Valerie Jeanne Kuck, Upper Montclair; Mark Anthony Paczkowski, Andover; Peter Gerald Simpkins, Chatham, all of N.J.

[73] Assignee: Lucent Technologies, Inc., Murray Hill, N.J.

[21] Appl. No.: 09/104,915

[22] Filed: Jun. 25, 1998

Related U.S. Application Data

[63] Continuation-in-part of application No. 08/915,493, Aug. 20, 1997, Pat. No. 5,858,053.

[51] Int. Cl.[6] .................................................. B05D 5/06
[52] U.S. Cl. .................................... 427/163.2; 427/434.7; 427/560; 427/565; 427/601
[58] Field of Search .......................... 427/163.2, 434.7, 427/560, 565, 601

[56] References Cited

U.S. PATENT DOCUMENTS

| | | | |
|---|---|---|---|
| 3,098,370 | 7/1963 | Poole et al. | 65/425 |
| 4,246,865 | 1/1981 | Shimada et al. | 118/65 |
| 5,512,335 | 4/1996 | Miller et al. | 427/600 |
| 5,529,816 | 6/1996 | Sartini et al. | 427/600 |

*Primary Examiner*—Janyce Bell
*Attorney, Agent, or Firm*—Mathews, Collins, Shepherd & Gould, P.A.

[57] ABSTRACT

An improved method of coating an optical fiber is disclosed. A transducer is submerged in a container of liquid coating material and activated so that it causes the formation of a wave of coating material within the container. The optical fiber is then drawn through the container and through the wave, the wave counterbalancing the negative meniscus produced by drawing the fiber through the container. A curved housing also may be placed in the container and surrounding the transducer for controlling the size, amplitude, shape, or direction of the wave. A plurality of transducers also advantageously may be used.

8 Claims, 2 Drawing Sheets

METHOD FOR COATING AN OPTICAL FIBER WITH A PLURALITY OF TRANSDUCERS IN A BATH OF COATING MATERIAL

RELATED APPLICATIONS

This case is a continuation-in-part of U.S. application Ser. No. 08/915,493, filed Aug. 20, 1997, now U.S. Pat. No. 5,858,053.

FIELD OF THE INVENTION

The present invention relates to an improved method of coating an optical fiber and, in particular, a method of coating an optical fiber where the fiber is passed through a bath of coating material and at least one transducer is placed in the bath and activated to create a focused standing wave, thereby inhibiting the drawing of air into the bath and the formation of air bubbles in the optical fiber coating.

BACKGROUND OF THE INVENTION

The operative aspects of an optical fiber typically comprise an inner core and a cladding layer surrounding the core. For most (if not all) applications, it is also desirable to provide a protective coating around the cladding or to encase the fiber within a tight-fitting tube. The protective coating is important for protecting the fiber from surface damage caused by handling or exposure to deleterious environments and reducing microbending losses. Typical materials used for coating optical fibers involve polymeric materials such as nylon, polypropylene, polyurethane, or kynar, a vinylidene fluoride polymer commonly used as an electrical insulator.

Customarily with prior art methods, the coating of the optical fiber is performed by passing the fiber through a bath of molten or liquid polymer (or other material used for the coating), and then curing the polymer after the fiber is removed from the bath by, for example, irradiation or passing the fiber through a furnace or other curing means. Such a prior art method is described below with reference to FIG. 1 hereof, which illustrates a customary method for simultaneously manufacturing and coating an optical fiber and wrapping it on a take-up drum.

With such methods, it is naturally desirable to increase the speed at which the fiber is passed through the polymer bath, because this will increase the efficiency and production output of not only the coating operation but also of the entire system. As the draw speed is increased, however, there is an increased tendency for air bubbles to be entrapped within the coating during the coating operation. Air bubbles can be problematic as they can affect the integrity of the coating and offer a capsule for collection of vapor or ambient contaminants. Additionally, air bubbles on or within the coating can induce or contribute to the formation of small deformations or "microbends" on the surface of the fiber; such microbends may affect the angles at which rays within the fiber reflect and lead to significant optical losses.

A previous method of dealing with the tendency of the optical fiber coating system to create air bubbles when the draw speed is increased involves the use of a clever die design and pressurization technique. This technique is premised on the principle that, when the draw speed is increased, the increased friction caused by the fiber passing through the liquid polymer tends to draw the polymer toward the bottom surface of the bath, thus causing the formation of an increased negative meniscus in the bath container and the drawing of additional air into the polymer bath. Therefore, with the pressurization technique, the pressurization of the die is used to form a positive (convex) meniscus of the liquid relative to the coating container to counteract the negative (concave) meniscus formed by the drawing of the fiber through the polymer bath.

There are, however, limitations to the pressurization technique, especially for higher draw speeds. Most particularly, the response time for creating the positive meniscus with this technique is slow, making it difficult to effectively adjust the rate of operation of the system in real time. Also, especially for high speed operations the speed of the system needs to be ramped-up slowly. Applying the pressurization technique, adjustments in the rate of speed of the system are difficult to effectively achieve and maintain.

The present invention is, therefore, addressed to a method of coating an optical fiber in which the fiber can be quickly drawn through a bath of coating material while minimizing the formation of air bubbles in the coating. The invention further embraces an apparatus for performing this method. Further advantages of this invention may appear more fully upon consideration of the detailed description below.

SUMMARY OF THE INVENTION

Summarily described, the invention embraces an improved method of coating an optical fiber of the type where the fiber is drawn through a container holding a bath of liquid or molten coating material and the coating material is then cured to harden on the fiber. With the method of this invention, an ultrasonic transducer is submerged in the container and disposed so that, when activated the transducer produces a standing wave within the bath of coating material; the fiber is drawn through the coating material so that the standing wave generated by the transducer counterbalances the negative meniscus produced by drawing the fiber through the container. A curved housing also may be placed in the container and surrounding the transducer for controlling the size, amplitude, shape, or direction of the wave. A plurality of transducers advantageously also may be used.

BRIEF DESCRIPTION OF THE DRAWINGS

For a better understanding of the invention, an exemplary embodiment is described below, considered together with the accompanying drawings in which.

It is to be understood that these drawings are for the purposes of illustrating the concepts of the invention and are not to scale.

DETAILED DESCRIPTION OF THE INVENTION

Figure 1:
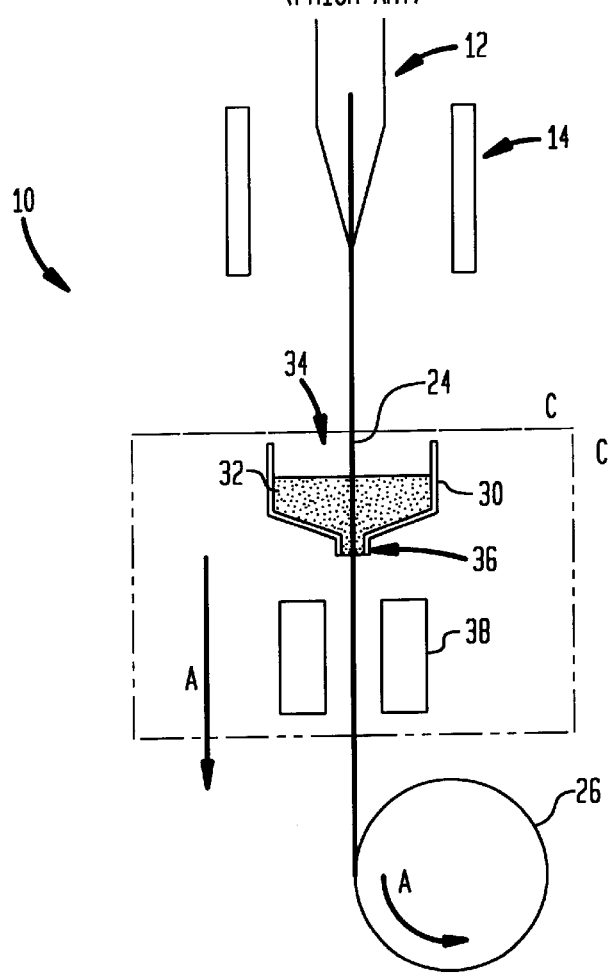
FIG. 1 shows a schematic cross-sectional view of a prior art method for simultaneously manufacturing and coating an optical fiber.

Referring to FIG. 1, there is shown a cross-sectional view of one prior art apparatus 10 to be used for simultaneously manufacturing and coating an optical fiber, described herein for exemplary and background purposes.

The apparatus 10 comprises an optical fiber preform 12 and a furnace 14. The temperature of the preform is raised sufficiently high to melt the cladding and core material so that the materials can be drawn out to form the fiber 24. The fiber 24 is drawn along path A onto a rotating take-up drum 26. Other means of forming optical fibers are known in the art, such as chemical vapor deposition techniques; the method used for making the fiber itself is not important for the purpose of illustrating the present invention, except to note that such methods customarily involve the use of a rotating take-up drum 26, with the manufacture of the optical fiber 24 often being performed simultaneously with the coating of the fiber, as will now be described.

The coating system is shown at the boxed region C—C of FIG. 1. Once the fiber 24 exits the furnace 14, along path A, and before being wrapped onto the take-up drum 26, the fiber is fed through a coating container 30, which houses a bath of liquid polymer 32 or other molten or liquid coating material. The coating container has an inlet 34 and an outlet 36, with the outlet 36 being adapted to allow for the passage of the fiber while minimizing leakage of the liquid polymer (or other coating material) from the container. Upon exiting the container at the outlet 36, the fiber is fed through a curing means 38, such as an irradiation source, a further furnace, or a curing oven, to cause the coating material to be hardened on the fiber before the fiber is wrapped on the take-up drum 26. The coating container can be configured to coat a single material or alternatively, coating cups can be stacked to simultaneously coat and cure two or more materials.

Figure 2:
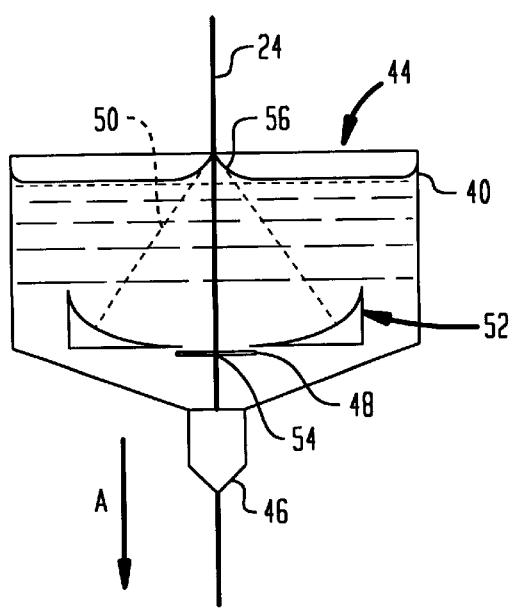
FIG. 2 shows a schematic cross-sectional view of a coating system illustrating one embodiment of the present invention method and apparatus.

Referring to FIG. 2, there is now shown an apparatus for use in performing the present invention method. Similar to the coating system in FIG. 1, there is shown a coating container 40, for housing a bath of liquid polymer 42 or other molten or liquid coating material. The container 40 has an inlet port 44 and an outlet port 46, with the outlet port 46 being adapted to allow for the passage of the fiber while minimizing leakage of the liquid polymer (or other coating material) from the container. The fiber 24 is drawn through the container 40, along the path of arrow A, from the inlet port 44 to the outlet port 46, from which it is delivered to the curing means and take-up drum (not shown).

With the present invention, a transducer 48 is submerged in the bath of coating material adjacent the outlet 46. The transducer is disposed so that, when activated, it causes the formation of a standing wave fountain 50, projecting upwardly in the direction of the inlet 44 and the surface of the liquid 42. Also, an optional housing 52 can be placed within the container and surrounding the transducer. The housing 52 is shown having a curved upper surface for directing the waves upwardly toward the inlet; the housing 52 can be configured of different sizes or shapes, with the important consideration being that its configuration may impact upon the size, amplitude, shape, or direction of the wave 50.

In one configuration, the transducer 48 advantageously is flat with a centrally-disposed hole 54 traversing it and co-axially aligned with the outlet port of the container 46. This way, the fiber may be fed through the transducer 48 directly to the outlet port 46, along a continuous path in the direction of arrow A. Preferably, the transducer is centrally-disposed in the container to create a wave having a centrally-disposed apex 56, and the fiber 24 is fed through the container to intersect the apex of the wave 56. The transducer 48 preferably comprises a high-frequency piezoelectric transducer, with the amplitude of the wave 50 being adjustable by varying the power to the transducer.

In operation, the transducer 48 is placed in the center of the curved housing 52 and disposed in the container 40 holding the liquid polymer 42 so that an acoustic wave will be directed at the surface of the liquid. The transducer is activated to create the wave 50, and the power is adjusted until the apex of the wave 56 reaches or projects above the surface of the liquid, as shown in FIG. 2. The fiber 24 is fed through the container, drawn through the liquid polymer 42 from the inlet 44, through the apex of the wave 56 and the central hole 54 in the transducer 48, to the outlet 46 along the direction of arrow A. The energy created by the wave increases the pressure of the liquid at the point the fiber 24 enters the liquid, thus counterbalancing the negative meniscus produced by the fiber moving into the liquid.

Figure 3A:
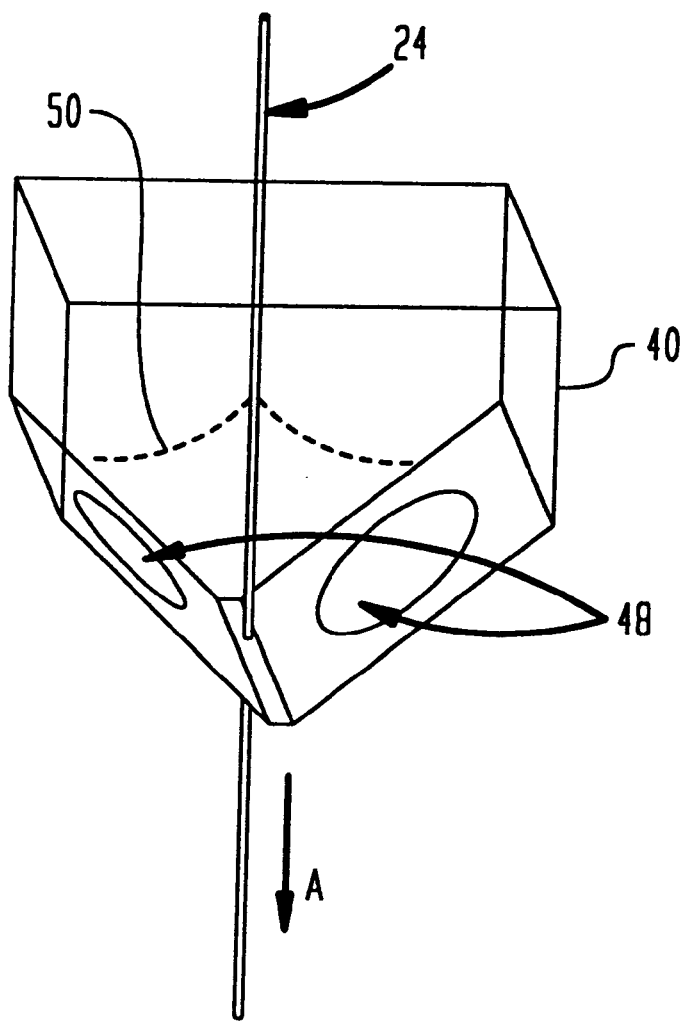
FIGS. 3A and 3B show schematic cross-sectional views of coating systems illustrating embodiments of the inventive method involving a plurality of transducers.
Figure 3B:
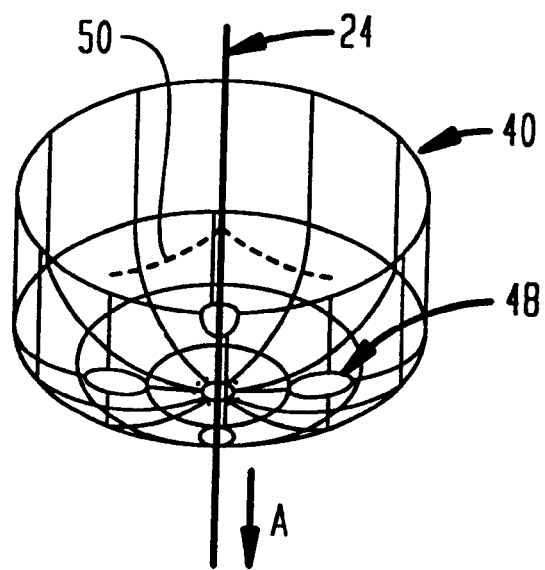

In other configuration as illustrated in FIGS. 3A and 3B (with like character references used to refer to like elements as shown in FIG. 2) a plurality of transducers also can be submerged within the container and operated synchronously; this way, a wide dynamic range of wave formation and adjustment can be quickly achieved, maintained, or discontinued. Also, the transducers may be horizontally arranged or placed in a variety of arrangements together with a plurality of housings. For example, as shown in FIGS. 3A–3B, the transducers may be axis-symmetrically arranged around the fiber. By optimizing the orientation, location, power, and frequency of the transducers, such a multiple array of transducers may be used to focus the surface wave and control its profile. In addition, by adjusting the power applied to the individual transducers, the surface wave can be moved in a desired direction. A relatively simple example of this invention involves a pair of transducers placed at equivalent angles on each side of the fiber. The orientation and proximity of the transducers relative to the fiber may be important.

The inventive method may be extended to any number of transducers and coating cups of various designs. For example, a pair of transducers may be placed within a coating cup having a pentagonal prismatic shape, as shown in FIG. 3A, with the apex of the pentagon facing downwardly and the fiber passing between the transducers through the bottom apex of the cup. Alternatively, three transducers could be symmetrically mounted on the inside faces of a tetrahedral cup (not shown), again with the apex facing downwardly, in such a way that the fiber passes through a hole at the bottom apex of the cup. An extension of this approach is to use a coating cup having a hemispherical reservoir with an array of transducers mounted on the inside surface, such as illustrated with the geodesic dome-shaped container 40 of FIG. 3B, having four transducers 48 disposed around the inside surface. In any case, the transducers may be individually controlled to produce the desired distortion of the surface of the liquid bath of coating material or the size, direction, shape, or amplitude of the wave 50.

An example of the operation of this apparatus is as follows: A single 2.5 mm×1.3 mm circular lead-zirconium-titanate ceramic element with a 1.5 mm hole bored through the center was used as the high frequency modulator. The base frequency of the element was approximately 2 MHz and the height of the standing wave (0–15 mm) was altered by adjusting the voltage supplied to the element. The element was placed in the center of a slightly convex metal housing as per FIG. 2. A liquid coating material with a viscosity of approximately 23 Poise (at 20° C.) was placed in the container above the transducer. A fiber was drawn into the liquid and through the hole in the center of the transducer, exiting the bottom of the container. When power was supplied to the transducer, a standing wave was generated at the entry point of the fiber into the liquid and when power was increased, the amplitude of the standing wave was also increased. Without power to the transducer, a negative meniscus was formed even at low draw speeds (0.1 meter/second) and air entrainment ensued. However, under the conditions where a standing wave is generated, no air entrainment was noticed until sufficient draw speed was attained to offset the standing wave. At this point, additional power to the transducer returned the standing wave to maintain a positive meniscus and air entrainment was again minimized. Therefore, higher draw speeds may require more power to the transducer and the power can be modulated in a feedback manner in real time by monitoring the height of the wave. At some draw speeds, the capability of a single transducer to maintain a positive meniscus becomes difficult and additional transducers may be added and activated to maintain the meniscus.

The efficiency of the standing wave is a strong function of the liquid coating properties (viscosity, surface tension, etc.) as well as the properties of the transducer. Thus, the optimal number of transducers needed to minimize air entrainment and the draw speeds may have to be adjusted depending on the coating material, the transducer, the container, the temperature and/or other variables of the process.

It will be understood that the embodiments described herein are merely exemplary and that a person skilled in the art may make variations and modifications without departing from the spirit and scope of the invention. All such variations and modifications are intended to be included within the scope of the appended claims.

We claim:

1. An improved method of coating an optical fiber wherein the fiber is drawn through a container holding a bath of liquid coating material, the container having an inlet port and an outlet port, and the fiber is drawn from the inlet port, to the outlet port, and to a curing means for hardening the coating material on the fiber, the improvement comprising the steps of:

disposing a plurality of transducers in the container; and activating the transducers in the bath, thereby forming at least one wave, wherein an apex of the at least one wave is directed substantially toward the inlet port; and drawing the fiber through the container from the inlet port to the outlet port so that the wave counterbalances a negative meniscus that would be produced by drawing the fiber through the container in the absence of the wave.

2. The method according to claim 1, wherein the plurality of transducers are operated synchronously to produce one wave.

3. The method according to claim 1, wherein the bath of coating material has an upper surface and the plurality of transducers are arranged substantially parallel to the upper surface of the liquid coating material.

4. The method of claim 1, wherein the plurality of transducers comprise a pair of transducers placed at equivalent angles relative to the fiber on opposite sides of the fiber.

5. The method of claim 4, wherein the container has a pentagonal prismatic shape with a bottom apex and the fiber is drawn between the transducers through the bottom apex of the container.

6. The method of claim 1, wherein the container has a tetrahedral shape with three inside faces intersecting at a bottom apex and one transducer is mounted on each one of the three inside faces to define three transducers substantially symmetrically mounted on the three inside faces of the tetrahedral container, the fiber being drawn through the bottom apex of the container.

7. The method of claim 1, wherein the container has an inside surface defining a hemispherical shape and a plurality of transducers are mounted on the inside surface of the container.

8. The method according to claim 1, further comprising the step of disposing a plurality of housings within the container such that a housing surrounds two or more of the plurality of transducers so that, when said wave is produced by one or more of the plurality of transducers, said wave contacts a housing and is modified to have a desired amplitude, shape or direction.

* * * * *